No. 705,608. Patented July 29, 1902.
J. M. PFAUDLER.
LUBRICATOR.
(Application filed Jan. 6, 1902.)
(No Model.) 2 Sheets—Sheet 2.

Witnesses
Walter B. Payne.
Elzabeth Perry

Inventor
John M Pfaudler
by Frederick H Church
his Attorney

UNITED STATES PATENT OFFICE.

JOHN M. PFAUDLER, OF ROCHESTER, NEW YORK.

LUBRICATOR.

SPECIFICATION forming part of Letters Patent No. 705,608, dated July 29, 1902.

Application filed January 6, 1902. Serial No. 88,555. (No model.)

*To all whom it may concern:*

Be it known that I, JOHN M. PFAUDLER, of Rochester, in the county of Monroe and State of New York, have invented certain new and useful Improvements in Lubricators; and I do hereby declare the following to be a full, clear, and exact description of the same, reference being had to the accompanying drawings, forming a part of this specification, and to the reference-numerals marked thereon.

My present invention has for its object to provide an oil-cup or lubricator capable of application to various classes of machinery and which is so constructed that the lubricant contained therein is prevented from being spilled and is also protected from dust or other foreign matter.

My invention has for its further object to provide means whereby the flow of oil in a predetermined quantity may be controlled at will and devices automatically operated to check said flow when the cup is opened.

To these and other ends the invention consists in certain improvements hereinafter described, the novel features being particularly pointed out in the claims at the end of this specification.

Figure 1:
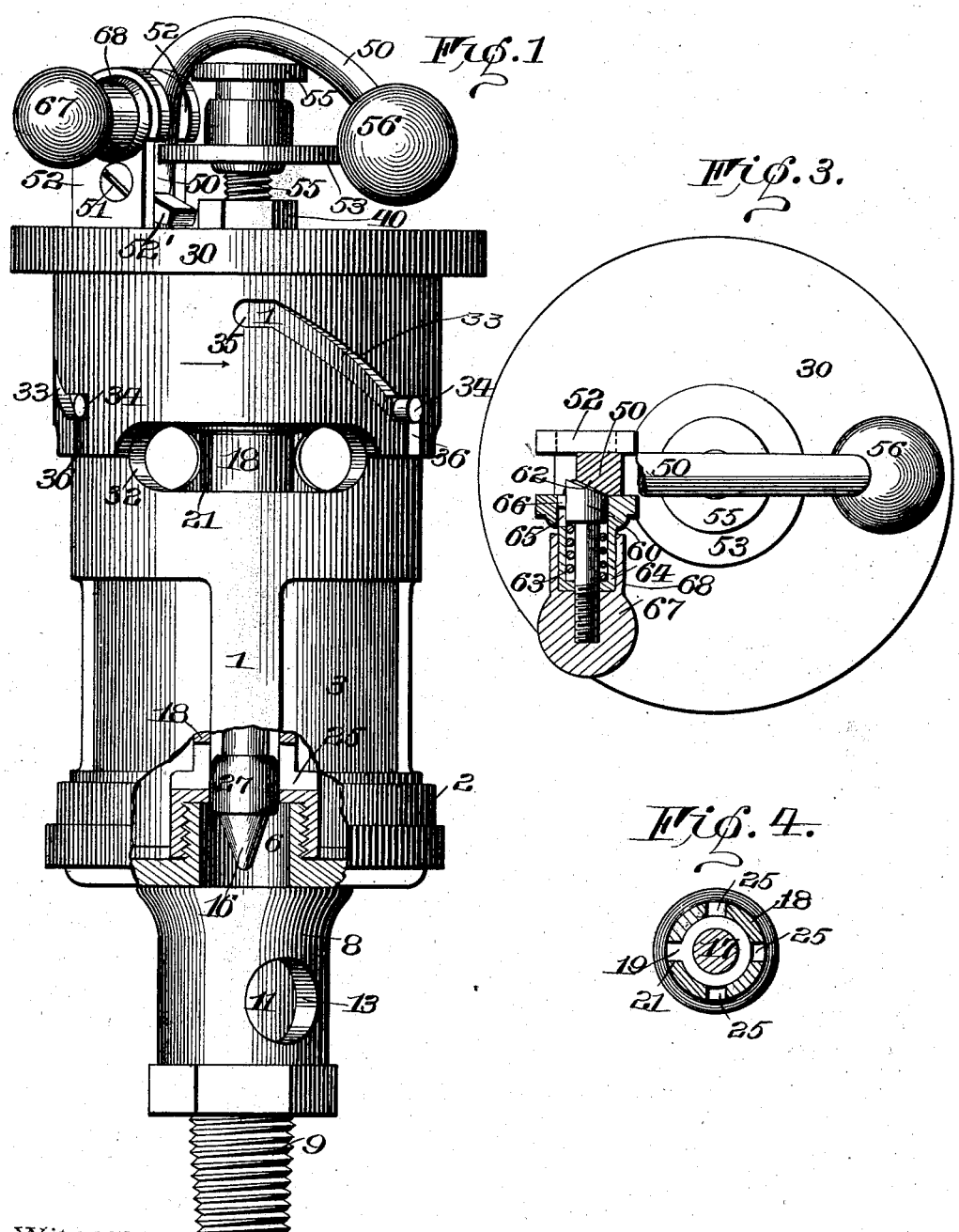
Figure 2:
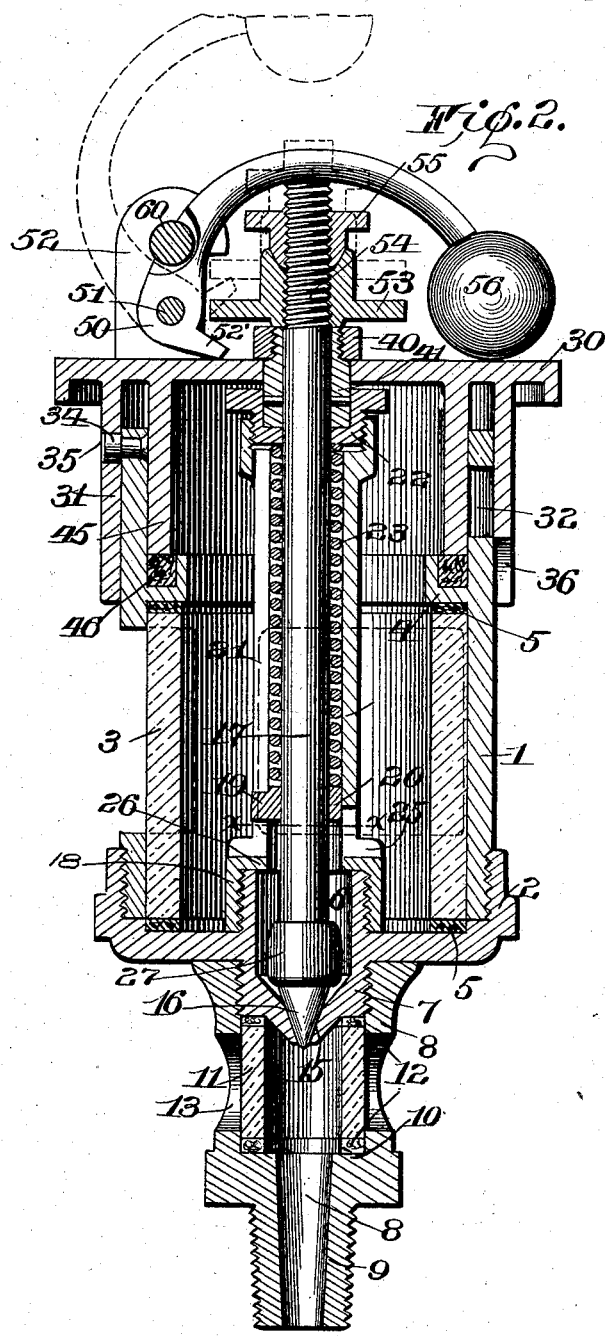

In the drawings, Figure 1 is a side elevation of an oil-cup or lubricator constructed in accordance with my invention shown in the open position and with a portion thereof broken away. Fig. 2 is a longitudinal sectional view thereof, showing the parts in the normal or closed position. Fig. 3 is a top plan view, and Fig. 4 is a cross-sectional view on the line *x x* of Fig. 2 looking upward.

Similar reference-numerals in the several figures indicate similar parts.

In constructing my device I employ a cylindrical body 1, having its lower end closed by the bottom or head 2, and if it is desired to permit an inspection of the contents from the exterior of the oil-cup the body may be provided with aperture, as shown, and an internal tubular body 3, of glass, secured therein between the head and an inner annular shoulder or rim 4, suitable packing-rings 5 being arranged between the ends of the glass tube and the adjacent parts. An exit-passage (indicated by 6) is arranged centrally in the cup, and upon the exterior of the latter and surrounding said passage is a threaded boss 7, to which is secured a feed-tube 8, provided on its lower end with a threaded extension 9, by means of which the device may be conveniently attached and supported in a vertical position upon a journal or bearing which it may be desired to lubricate or to a conduit leading thereto.

10 indicates a shoulder formed in the feed-tube, and a glass shell 11, mounted in the latter and secured between packing washers or rings 12, abutting the shoulder and the end of the boss 7, permits the lubricant to be seen as it passes from the cup, apertures 13 being provided in the feed-tube for this purpose.

The lower end of the exit-passage 6 forms a valve-seat 15, with which coöperates the tapered or conical end 16, forming a needle-valve, the stem 17 of which extends upwardly through the top of the lubricator and is provided with suitable adjusting devices, as will be further described. A central tubular guide or support 18 for the valve-stem is secured upon the interior of the head 2, and the rod is prevented from rotation therein by means of projection 19 on a collar 20, secured to the stem and operating in a slot 21 to permit its longitudinal movement in the support. The upper end of the latter is closed by a head 22, and a spring 23, located between the latter and the collar 20, serves to normally project the end 16 and to hold it in engagement with the valve-seat 15. Suitable apertures 25 are provided near the lower end of the tubular support 18, and the end 26 of the latter forms a secondary valve-seat, with which an annular flange or valve-head 27 on the stem 17 coöperates to prevent the escape of the lubricant when said stem is given an excessive upward movement, as will be more fully described.

The cup is provided with a cap or closure 30, having the depending wall 31, surrounding the upper end of the body 1 and normally covering apertures 32 in the upper end thereof, through which the lubricant may be introduced. Provided in the depending wall or flange are a plurality of spiral cam-slots 33, adapted to coöperate with pins or projections 34 on the body 1, whereby the cap may be elevated when a rotary motion is imparted to it to raise its lower edge above the apertures 32, and the ends of said slots are extended horizontally, as at 35, said portions holding the cap when in elevated or closed positions, as will be understood. The slots are open at their outer ends at 36, which permits the cap to be disengaged from the pins 33 and to be removed from the body. The cap is connected to the valve-stem 17 for operating the latter simultaneously therewith to close the exit-passage when the cup is opened to permit filling it or for other purposes by means of a stop in the form of a nut 40, mounted on a collar 41, secured to the rod, which collar extends through the cap and engages the head 22. This construction is desirable, as I am enabled to relieve the spring-pressure of the needle-valve on its seat when in the closed position by adjusting the cap 22 on its screw-thread relative to the valve-seat 15, and thus prevent undue wear upon the parts of the valve. The nut 40, engaging the cap, will cause the valve-stem to be carried upwardly with the cap as the latter is raised by the cam-slots to carry the head or flange 27 into the end 26 of the support to close the exit-passage.

In order to prevent the lubricant from spilling or slopping over the top of the cup or through the apertures 32, I provide an internal flange or rim 45 on the cap, which when the latter is closed engages a seat preferably formed by a ring of packing 46 arranged in a recess in the upper side of the annular flange or shoulder 4. It will be readily understood that the cam-slots 33 might be arranged in the flange 45 and the pins (indicated by 34) located on the inner surface of the cup, which arrangement would permit the outer wall 31 to be omitted, if desired.

The supply of lubricant passing from the cup is regulated by the valve, the plunger or conical end 16 thereof being operated relative to the valve-seat 15 by means of a bell-crank lever 50, pivoted on a pin 51, supported on lugs or posts 52 on the cap or closure 30 and having an arm 52, engaging beneath a projection or rim on a nut 53. The latter is adjustably mounted on the threaded end 54 of the stem 17 and may be moved upwardly or downwardly thereon to cause the end 16 to be moved a greater or lesser distance relative to the valve-seat when the lever 50 engages therewith.

55 indicates a locking-nut engaging the proximate face of the nut 53 to prevent independent movement of the latter and to secure it in adjusted position, one of such engaging surfaces being concaved and the other convex to afford a greater frictional surface.

The pivotal point of the lever is located at one side, and its outer end curves over the cap and is provided with a knob or ball 56, forming a convenient handle by which it may be manipulated and also adds sufficient weight to the lever to move it to the inoperative position when released. The position of the lever indicates whether the valve is in the opened or closed position, and while the latter might be retained in the former position by moving the lever past its center, as will be understood, I prefer to positively lock the latter, so that the valve-stem may not be accidentally released and the valve closed inadvertently. For this reason I provide upon one of the lugs 52 a locking device embodying a latch member 60, having the beveled face coöperating with a similar surface 62 on the side of the lever and adapted to be projected beyond the edge of the latter by a spring 63. The latch member is mounted and guided in a recessed extension 64, at one side of which is provided a notch 65, receiving a pin 66 to secure the latch member against rotary movement, and mounted on the outer end of said member is a knob or handle 67, provided with a sleeve 68, surrounding the extension 64. These parts on such devices are usually small, and by arranging the sleeve as shown I am enabled to provide a more convenient handle and prevent injury to the operator's fingers from being pinched between the proximate surfaces of the knob and extension when releasing the latch.

An oil-cup or lubricator constructed in accordance with my invention may be used upon any class of machinery, and the liquid lubricant contained therein is prevented from being spilled by the movement of the part on which it may be mounted, and, further, it is thoroughly protected and prevented from accumulating dust. By arranging a separate valve-operating mechanism as described the nut 53 may be adjusted as desired and the flow of lubricant controlled by opening the valve by raising the lever 50 to the position shown in dotted lines in Fig. 2, when it is secured by the latch member 60. The spring 23, operating to project the end of the valve-stem into engagement with its seat, holds the cap or closure in its normal position and when released by releasing the lever 50 will cause the lever to snap down upon the top of the stem with a hammer action, causing the latter to be settled positively upon its seat in case sediment or small particles of material should become lodged thereon, tending to prevent the tight closing of the valve.

The device I have described is simple and compact, and while I deem the construction as shown to be the most practical for general purposes various modifications may be devised by those skilled in the art without departing from the spirit of my invention.

I claim as my invention—

1. In a lubricator the combination with a cup having an exit-passage provided with two separate valve-seats, a valve-head engaging one of the seats to normally close the exit-passage when the cup is not in operation, of a closure on the cup, connections between the closure and valve-head whereby the latter may be operated relative to one of the valve-seats to open the exit-passage when the cup is in operation and engaged with the other seat to close said passage when the cup is opened.

2. In a lubricator the combination with a cup, having an exit-passage provided with a valve-seat, a non-rotatable valve-head normally engaging therewith to close the passage when the cup is not in operation, a second valve-seat arranged above the head, and means for operating the valve-head relative to the first-mentioned seat, of a closure for the cup, and connections between the closure and valve-head operating to move the head into engagement with the second valve-seat when the cup is opened.

3. In a lubricator the combination with a cup having an exit-passage, a valve-seat and a valve-head engaging therewith to normally close the passage, and a second valve-seat located above the head, of an operating mechanism for adjusting the head relative to the first-mentioned seat, a closure movable vertically on the cup to open it, a connection between the closure and the valve-head and means for supporting the closure in open position with the head in engagement with the second seat to close the exit-passage.

4. In a lubricator the combination with a cup having an exit-passage, a valve-seat therein and a valve-stem having the head lying beyond the seat, of a closure movable longitudinally on the cup, connections between the closure and valve-stem, means for retaining the closure in the open position with the head in engagement with the valve-seat, and operating devices tending to move the head to its normal position out of engagement with the valve-seat and to return the closure when the latter is released.

5. In a lubricator the combination with a cup having an exit-passage provided with a valve-seat, a stem having the head engaging the seat to normally close the passage, and a guide having a stop, of a stop on the stem coöperating with that on the guide to limit the closing movement of the stem, one of said stops being capable of adjustment relative to the valve-seat, and an operating mechanism for moving the stem to open the valve.

6. In a lubricator, the combination with a cup having vertically-extending sides provided with an aperture located near its upper edge, of a cap having the depending flange normally covering said aperture and movable vertically on the cup, said flange being provided with recesses extending from the lower edge toward the upper edge of the flange and having horizontally-extending portions at their ends, and said cup being provided with pins lying in the recesses and supporting the flange above the aperture in the cup when engaged by the lower horizontal portions of the recesses.

7. In a lubricator, the combination with a cup having vertically-extending sides provided with an aperture, of a cap having the depending flange normally extending over the aperture and provided with recesses, pins on the cup having the ends lying in the recesses, and a shoulder on the cup arranged below the aperture and adapted to be engaged by the end of the flange when the cap is in the closed position.

8. In a lubricator, the combination with a body having apertures, a shoulder arranged upon the interior of the body above the apertures, a head removably secured to the body below said apertures, and a shell of transparent material arranged in the body and secured between the shoulder and head, of a cap mounted upon the upper end of the body having the depending flange extending into the latter, and means for causing the flange to normally engage the annular shoulder to close the body.

9. In a lubricator, the combination with a cup having an exit-passage, a valve-seat, and a valve-stem having the end engaging therewith to normally close the passage, and a spring operating the stem toward the seat, of a lever pivoted at one side of the stem having the end engaging the stem, and a latch for securing the lever in the operative position against the tension of the spring to hold the valve-stem out of engagement with the valve-seat.

10. In a lubricator, the combination with a cup having an exit-passage, a valve-seat, and a valve-stem coöperating therewith to normally close the passage, of a lever pivoted on the cup, adjustable connections between the lever and stem to regulate the movement of the latter relative to the valve-seat and a latch operating automatically to engage the lever and support the stem out of engagement with its seat.

11. In a lubricator, the combination with a cup having an exit-passage, a valve-seat, and a valve-stem having the end engaging therewith, of an adjustable nut on the stem, an operating-lever pivoted to the cup at one side having the end extending beneath the nut, and a latch device engaging the lever to hold the valve-stem in operative position.

12. In a lubricator, the combination with an oil-cup having the exit-passage, a valve-seat in said passage and a stem having the end engaging therewith, and a spring tending to move the stem toward the valve-seat, of a bell-crank lever pivoted on the cup having one end extending over the stem and the other engaging therewith when moved in one direction, and a latch device for holding the lever in operative position against the action of the spring on the stem.

13. In a lubricator, the combination with an oil-cup having the bottom provided with an exit-passage, and a valve-seat, a stem having the end engaging therewith to close the passage, and a support having the cap adjustable thereon relative to the valve-seat and surrounding the stem forming a guide therefor, of a spring arranged beneath the cap and engaging the stem to operate it toward its seat, a stop on the stem engaging the cap, and an adjustable projection on the outer end of the stem, a lever pivoted to the cup having the end lying beneath the projection, and a latch engaging the lever to hold the valve-stem elevated from its seat against the tension of the spring.

14. In a lubricator, the combination with an oil-cup having exit-passages in the bottom, a valve-seat and a valve-stem having the end engaging the seat and provided with a valve-head, and a second valve-seat arranged above the first, both seats being below said passages, of a movable closure for the cup, connections between the closure and stem to cause the head thereon to move into engagement with the second valve-seat, and a lever pivoted on the closure and connected to the stem to move it relative to the first valve-seat independently of the movement of the closure.

15. In a lubricator, the combination with an oil-cup having the bottom provided with a valve-seat therein, a valve-stem having a head, a support forming a guide for the stem having the end forming a valve-seat arranged above the head, and a spring operating to hold the latter normally in engagement with the first-mentioned seat, of a closure movably mounted on the cup, connections between the closure and stem for operating the head on the latter into engagement with the second valve-seat when the closure is opened, a projection on the valve-stem, and a lever pivoted on the closure having the end engaging therewith to move the stem relative to the first seat independently of the movement of the closure.

16. In a lubricator, the combination with a cylindrical body having the bottom provided with a valve-seat, a second valve-seat arranged above the latter, a valve-head adapted to engage either of said seats, and a rim on the body, a closure on the upper end of the body movable vertically relative thereto, and a depending flange on the closure, of a guide within the body, a stem movable in the guide and attached to said valve-head and having its end extending through the closure and engaging the outer side thereof, whereby the valve-head is moved into engagement with the second seat when the closure is opened, an adjustable projection on the stem, a lever pivoted on the closure having the end engaging the projection to adjust the valve-head relative to the first valve-seat, and a spring operating to return the movable parts to their normal position and to hold the depending flange of the closure in engagement with the rim on the body.

17. In a lubricator, the combination with the body having the exit-passage, a valve-seat surrounding the latter, and a movable cap for the upper end of the body, of a valve-stem engaging the cap and having a head for closing the exit-passage and a spring operating on the stem to hold the valve on its seat and to hold the cap on the body.

JOHN M. PFAUDLER.

Witnesses:
G. WILLARD RICH,
WALTER B. PAYNE.